UNITED STATES PATENT OFFICE.

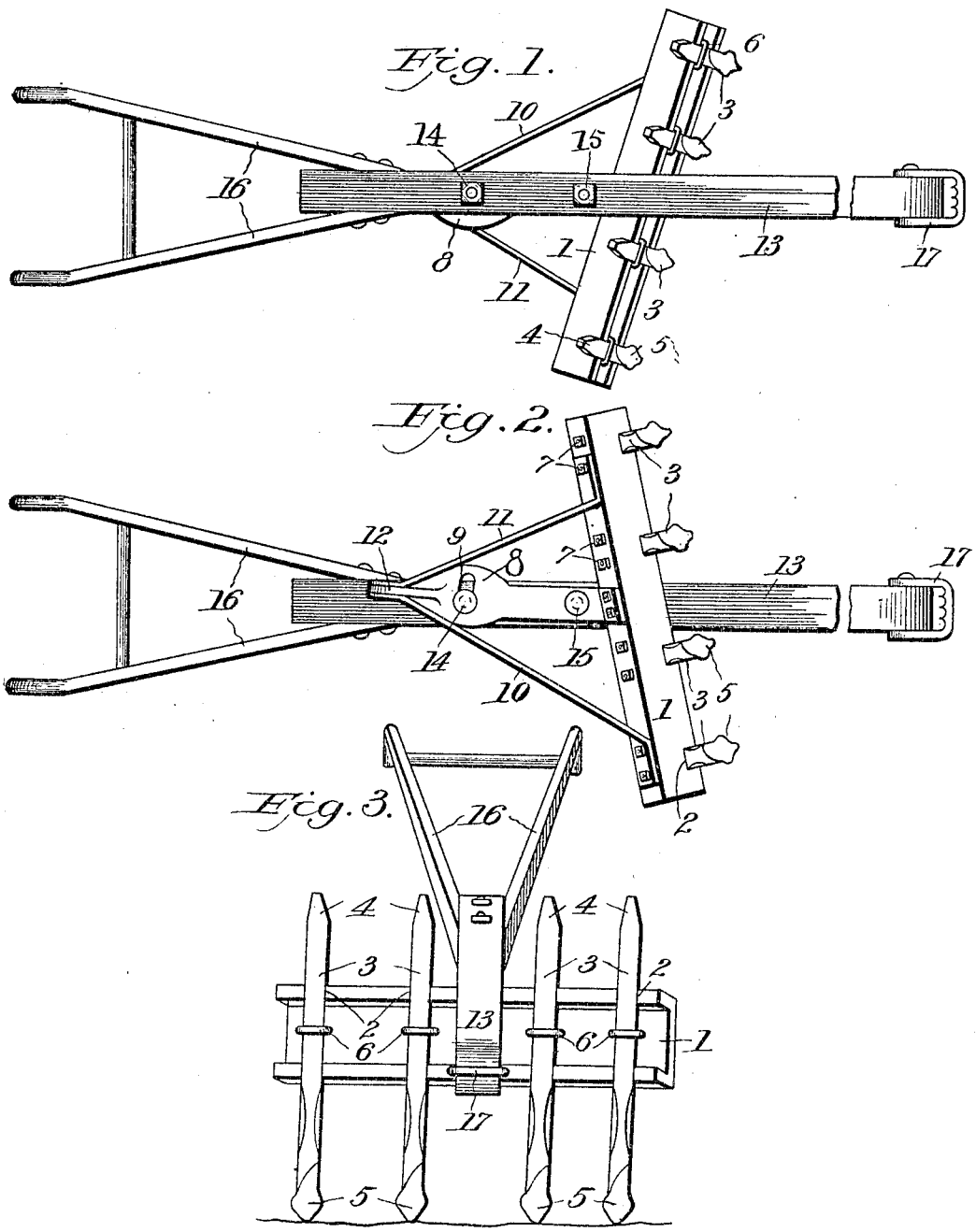

BENJAMIN F. PRICE, OF VANWINKLE, MISSISSIPPI.

HARROW.

No. 802,112.  Specification of Letters Patent.  Patented Oct. 17, 1905.

Application filed August 27, 1904. Serial No. 222,375.

*To all whom it may concern:*

Be it known that I, BENJAMIN F. PRICE, a citizen of the United States, residing at Vanwinkle, in the county of Hinds and State of Mississippi, have invented new and useful Improvements in Harrows, of which the following is a specification.

My invention relates to harrows, and especially to that class of harrows known as "side" or "oblique" harrows.

The object of my invention is to provide a harrow which is adapted to replace a plow and to be secured to and beneath the plow-beam and to be attached thereto by the bolts or other means employed for attaching the plow to the beam.

The further object of my invention is to provide a harrow especially adapted for use in cultivating on the side of a row or bed and to remove grass and weeds and leave the earth smooth and in good condition for a cultivator, which may follow at any time desired.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a top plan view of my improved harrow. Fig. 2 is a view of my harrow in plan viewed from the under side. Fig. 3 is a view of my harrow in end elevation.

Like characters of reference designate corresponding parts throughout the several views.

In its preferred embodiment my harrow comprises a harrow-bar 1, consisting of a length of channel-iron. Within the edges of the upturned flanges of the bar 1 are formed seats 2, within which are disposed harrow-teeth 3. The teeth 3 are provided with with points 4 upon one end thereof, the opposite ends thereof being spoon-shaped, as at 5. Staple-shaped members 6 embrace the teeth 3 intermediate of the upturned flanges of the bar 1, through which the ends are passed and nuts 7 placed thereon, adapted to secure the teeth 3 within the seats 2. To the rearward side of the bar 1 is secured a plate 8, adapted to occupy approximately a horizontal position and provided with a slot 9 transverse thereof. Braces 10 and 11 are likewise secured to the rearward side of the bar 1 near the ends thereof and converge and are secured to the plate 8 at the point 12. The harrow thus assembled is designed to be attached to a plow-beam 13 by the bolts 14 and 15, which are provided for securing the plow to the beam. The bolt 14 passes through the slot 9, and the bolt 15, serving as a fulcrum, the harrow may be adjusted at a predetermined angle to the plow-beam and secured at such angle by the bolt 14. The plow-beam 13 is provided at its rearward end with the usual handle 16 and at its forward end with a clevis 17 or other means for attaching the motive power.

The operation of my improved harrow is as follows: With the beam 1 secured to and disposed obliquely of the beam 13 the relative angle thereof may be adjusted by loosening the nut on bolt 14 and moving the brace 8 to the right or left, and when the desired angle is obtained the harrow may be retained thereat by tightening the bolt 14.

While I have shown and described my improved harrow in connection with a plow-beam, it is to be understood that I make no claim of invention in the beam, claiming such beam only in combination with the harrow, and that my said harrow may be made and provided with the beam, as shown, or separate from the beam and adapted for attachment to any plow-beam commonly in use by the removal of the plow from such beam.

It is obvious that minor changes in the form and construction of my improved harrow may be made without departing from the spirit of my invention or the scope of the claims.

Having thus described my invention, what I claim as novel, and desire to secure by Letters Patent, is—

1. In a harrow adapted to be secured to a plow-beam, a bar rigidly secured to a rearwardly-extending plate disposed obliquely thereto and braces secured adjacent the ends of the bar and converging at and secured to the rear end of the plate, the said plate being provided with means for securing to a plow-beam and with means to vary the angularity of the bar relative to the beam.

2. In a harrow adapted to be secured to a plow-beam, a bar rigidly secured to a rearwardly-extending plate disposed obliquely thereto and in a substantially horizontal plane, the said plate being provided with an opening arranged for pivoting to a plow-beam and with a slot arranged to vary the angularity of the bar to the beam and bolts passed through the opening and slot and proportioned to pass through the beam.

In testimony whereof I affix my signature in presence of two subscribing witnesses.

BENJAMIN F. PRICE.

Witnesses:
A. P. LUSK,
R. H. BELL.